United States Patent
Leschinger et al.

(10) Patent No.: US 6,455,772 B1
(45) Date of Patent: Sep. 24, 2002

(54) DATA TRANSMISSION PEDESTAL EXTENSION

(75) Inventors: Matthew Leschinger, Wheaton; Lawrence Dolan, Carol Stream, both of IL (US); Gerald Frazier, Brandon, MS (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/910,597

(22) Filed: Jul. 20, 2001

(51) Int. Cl.[7] ................................................. H02G 9/00
(52) U.S. Cl. ................... 174/38; 174/39; 52/3
(58) Field of Search ............................ 174/50, 38, 39, 174/17 CT, 58, 59, 60, 37; 220/3.3; 361/641; 52/3

(56) References Cited

U.S. PATENT DOCUMENTS

| | | | |
|---|---|---|---|
| 3,480,721 A | * 11/1969 | Baumgartner | 174/38 |
| 3,868,474 A | * 2/1975 | Bunten | 174/60 X |
| 3,872,234 A | * 3/1975 | Smith | 174/38 |
| 4,190,734 A | * 2/1980 | Dressler, Jr. | 174/38 |
| 4,365,108 A | * 12/1982 | Bright | 174/50 |
| 6,198,041 B1 | 3/2001 | Leschinger et al. | |

* cited by examiner

Primary Examiner—Anthony Dinkins
Assistant Examiner—Dhiru R. Patel
(74) Attorney, Agent, or Firm—Jones, Day, Reavis & Pogue

(57) ABSTRACT

An extension housing for a data transmission pedestal is disclosed. The extension has an upper portion essentially identical to the upper portion of a base of a pedestal and a lower portion essentially identical to the lower portion of a cover section of a pedestal. The extension is simple and inexpensive and can be used singly or in multiple quantities depending upon the pedestal height to be achieved. The use of extensions alleviates inventory of different size pedestals and allows quick and easy height adjustments in the field.

18 Claims, 3 Drawing Sheets

Fig. 1
Fig. 2
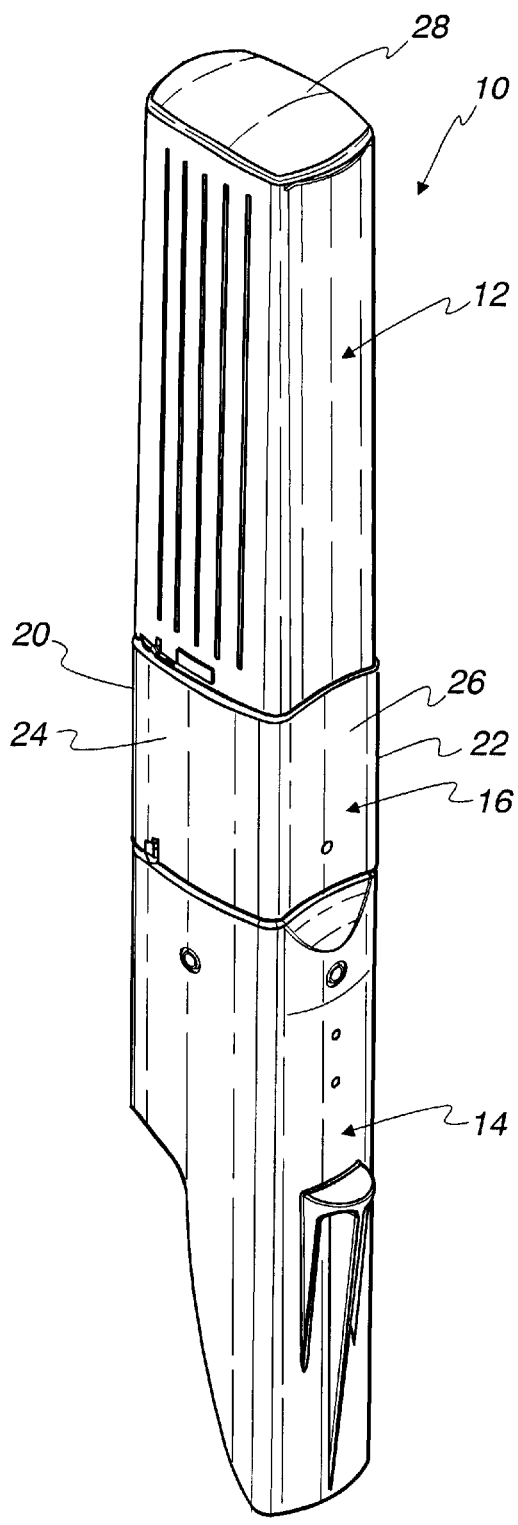
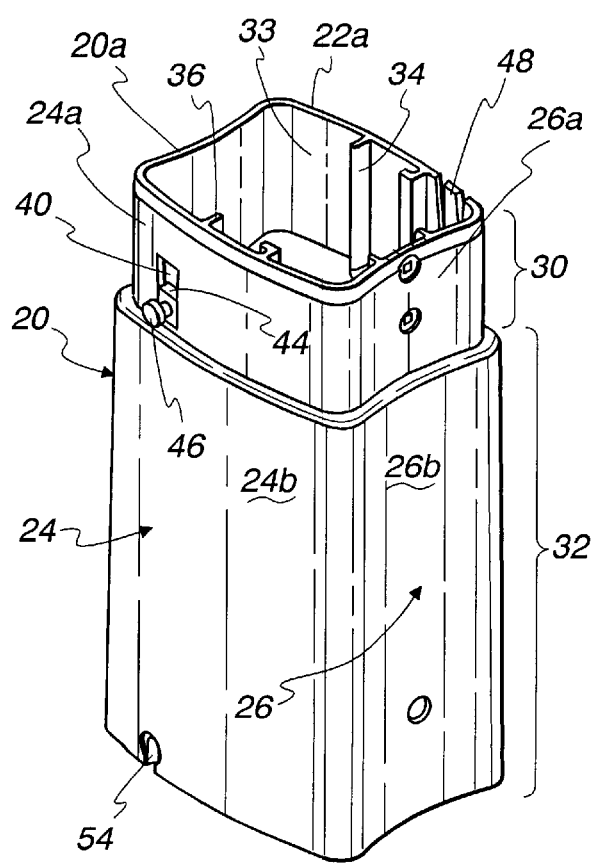

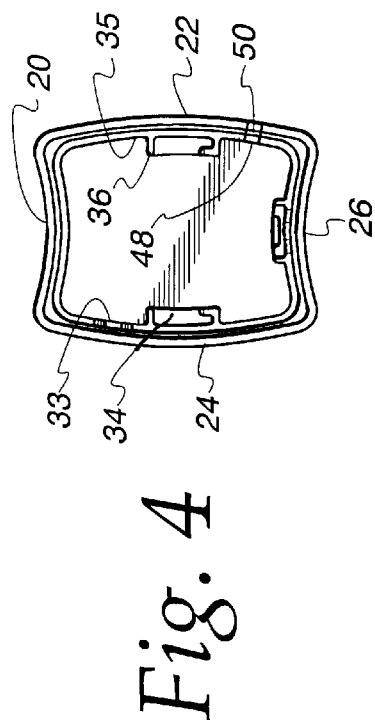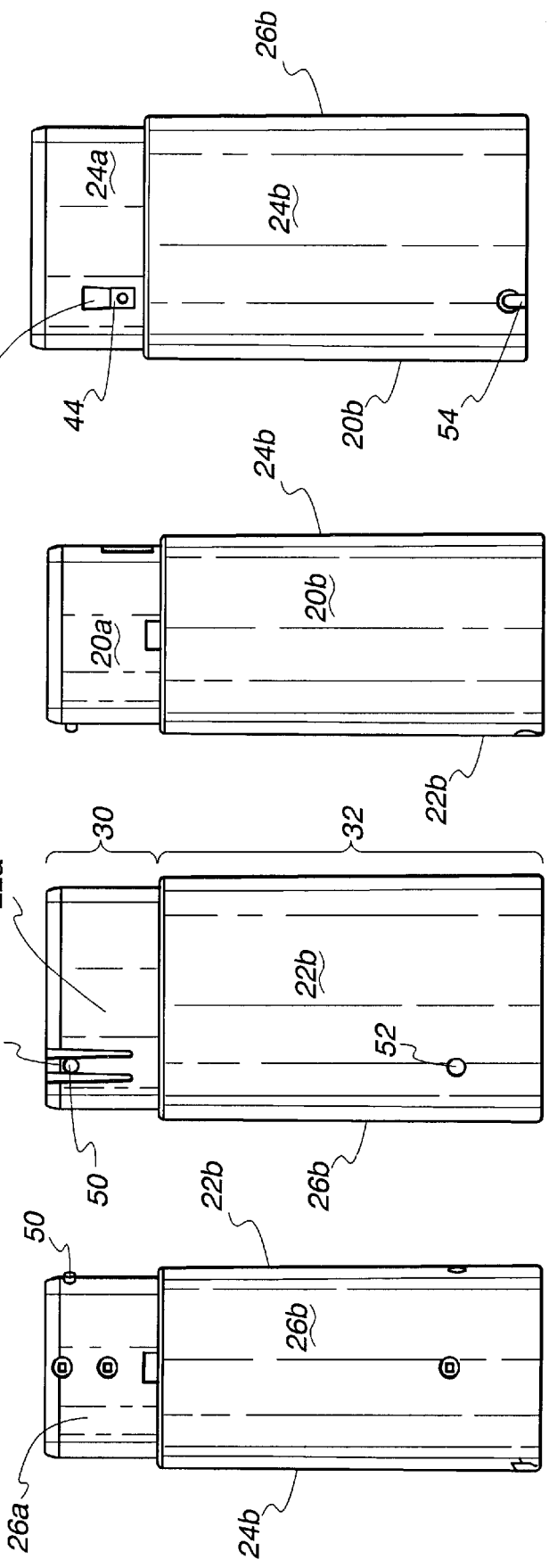

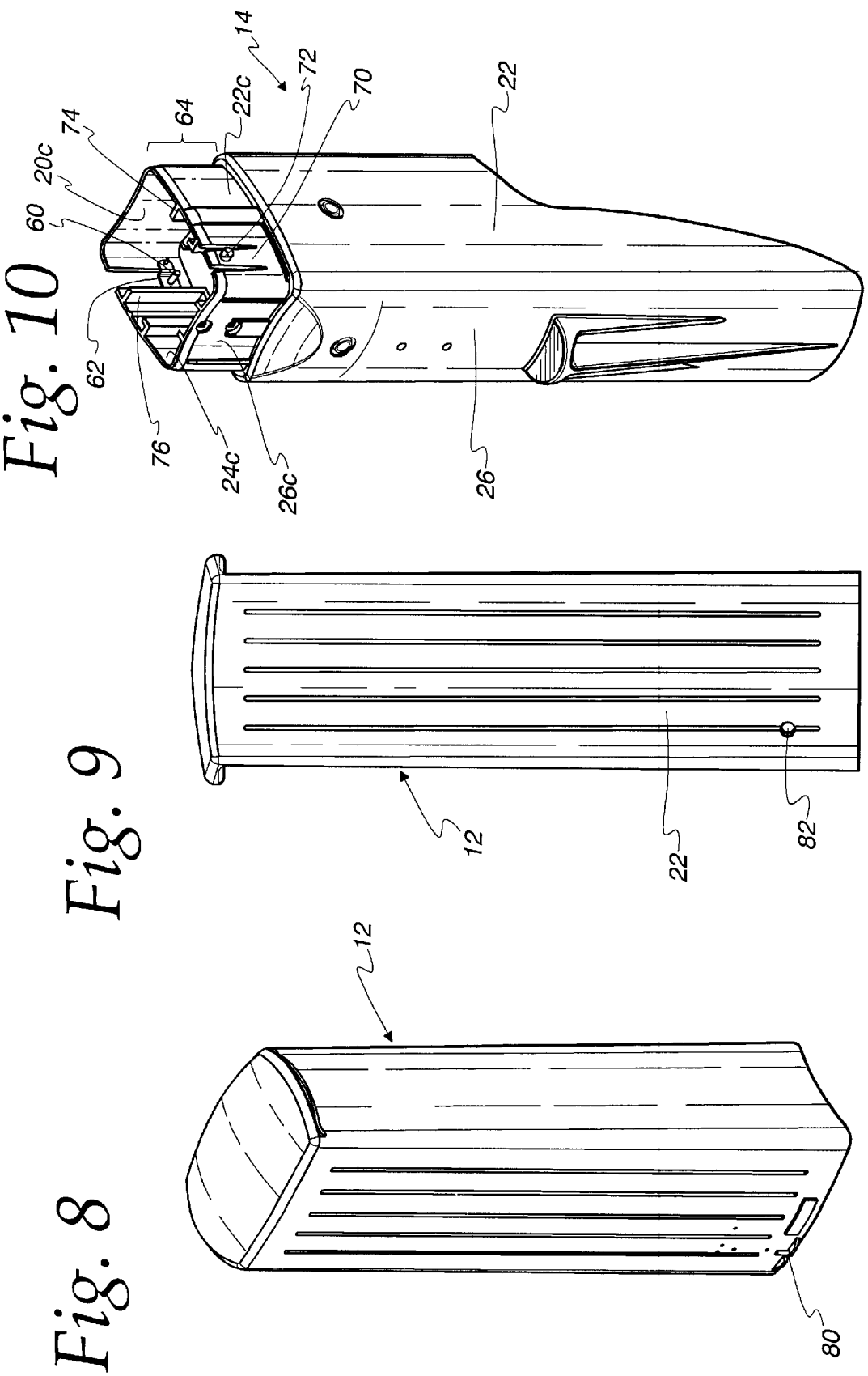

DATA TRANSMISSION PEDESTAL EXTENSION

BACKGROUND OF THE INVENTION

1. Field of the Invention

The present invention relates to an extension for a data transmission pedestal and more particularly to a data transmission pedestal extension that minimizes inventory costs and allows for field expansion of existing pedestals.

2. Description of the Related Art

Data transmission lines connect central distribution offices to customer locations usually through buried underground cable. In close vicinity to a customer's location, the data transmission cable is brought above ground where preselected lines of the cable are connected to an underground service line from the customer, whose line is also brought above ground. The appropriate cable lines and service line are connected by the use of terminal blocks mounted to grounded frames. These above-ground connections are then covered by a pedestal to protect the electrical connections against weather and other environmental factors, as well as against tampering and vandalism. The pedestal may be opened to facilitate service of the lines and cable and to allow additional service lines to be connected to the cable.

At times, there is a need to extend the height of a pedestal due to tall grass or deep snow or after there is a change in the final grade of the surrounding terrain. Such a change necessitates a new longer pedestal and a time consuming and expensive exchange. Such an exchange also requires a disconnection of the cable and service lines thereby interrupting service to customers. Further, there is the disadvantage of requiring that a large inventory of different size pedestals be available to accommodate different height requirements.

BRIEF SUMMARY OF THE INVENTION

The difficulties encountered by the above mentioned problem have been overcome by the present invention. What is described here is a data transmission pedestal extension comprising a housing having a front wall, a left side wall, a right side wall and a rear wall, the housing being divided into an upper portion and a lower portion, the lower portion having walls with larger dimensions than the walls of the upper portion, the lower portion having an open bottom for receiving an upper portion of a pedestal base or the upper portion of another pedestal extension in a telescoping relationship, the upper portion also having an open top and dimensioned to be received by the lower portion of a pedestal cover or the lower portion of another extension housing, also in a telescoping relationship, and openings formed in the upper and lower portions of the housing.

There are a number of advantages, features, and objects achieved with the present invention which are believed not to be available in earlier related devices. For example, one advantage is that the pedestal extensions are simple to use and relatively inexpensive. Another object of the present invention is to provide a pedestal extension which will minimize inventory costs. Still another aim of the present invention is to provide a pedestal extension that may be used in the field with existing pedestals. A further advantage of the present invention is to provide a pedestal extension that may be used in multiple numbers thereby adding flexibility in constructing a pedestal with the proper height.

A more complete understanding of the present invention and other objects, advantages, and features thereof will be gained from a consideration of the following description of the preferred embodiment read in conjunction with the accompanying drawing provided herein.

BRIEF DESCRIPTION OF THE SEVERAL VIEWS OF THE DRAWINGS

FIG. 1 is a right rear isometric view of a data transmission pedestal illustrating the extension of the present invention.

FIG. 2 is an enlarged isometric view of the extension shown in FIG. 1.

FIG. 3 is a rear elevation view of the pedestal extension shown in FIG. 2.

FIG. 4 is a top plan view of the pedestal extension shown in FIGS. 2 and 3.

FIG. 5 is a left side elevation view of the pedestal extension shown in FIGS. 2–4.

FIG. 6 is a front elevation view of the pedestal extension illustrated in FIGS. 2–5.

FIG. 7 is right side elevation view of the pedestal extension illustrated in FIGS. 2–6.

FIG. 8 is an enlarged isometric view of the pedestal cover section shown in FIG. 1.

FIG. 9 is a left side view of the pedestal cover section shown in FIG. 8.

FIG. 10 is a left rear isometric view of the pedestal base section shown in FIG. 1.

DETAILED DESCRIPTION OF THE INVENTION

While the present invention is open to various modifications and alternative constructions, the preferred embodiment shown in the drawing will be described herein in detail. It is understood, however, that there is no intention to limit the invention to the particular form disclosed. On the contrary, the intention is to cover all modifications, equivalent structures and methods, and alternative constructions falling within the spirit and scope of the invention as expressed in the appended claims.

Referring now to FIG. 1, a data transmission pedestal with an extension is designated generally by the reference numeral 10. The pedestal is an elongated housing defined by a cover section 12 and a base section 14. To give the pedestal extended height, a pedestal extension 16 is shown attached to the pedestal. A fuller disclosure of a data transmission pedestal is contained in U.S. Pat. No. 6,198,041 which disclosure is incorporated here by reference.

An interior chamber is formed by the pedestal housing. The housing includes a front wall 20, a left side wall 22, a right side wall 24, a rear wall 26 and a top wall 28. The simplicity and relative low cost of the extension may be seen by referring to FIGS. 2–7. The extension 16 includes the four walls 20, 22, 24, 26 and is divided into an upper portion 30 and a lower portion 32. These walls also form a housing. As can be seen, the upper portion has four walls 20a, 22a, 24a, 26a which have smaller dimensions than the walls 20b, 22b, 24b, 26b of the lower portion. This allows the upper portion to be received in a telescoping manner by the cover 12 of the pedestal or by another pedestal extension. The upper portion 30 of the extension has the same interior arrangement as an upper portion of the base 14 of the pedestal. In the upper portion of the extension, attached to inner surfaces 33, 35 of the walls 22a, 24a, respectively, there are oppositely disposed mounting channel members 34, 36 for receiving the flexible legs of a mounting plate (not shown) whereby the mounting plate may be removably attached to the extension 16 in the same way that it is attached to the base of the pedestal.

Also located in the upper portion 30 of the extension is a first opening 40 mounted in the right side wall 24a. The first opening 40 is partially covered by a bracket 44 with a thread hole to mount a threaded fastener 46. The upper portion 30 also includes a flexible tab element 48 having a cylindrical projection 50 at its end. As will be explained, the flexible tab and projection are cammed out of position when the extension is telescoped into a cover section or another extension and when full engagement is reached the tab springs back and the projection enters an opening in the cover section or other extension to create an interference fit.

The lower portion 32 of the extension includes a hole 52 in the left side wall 22b and a slot 54 in the right side wall 24b. The hole 52 is positioned to receive a cylindrical projection, like the projection 50, of another extension or of a base section to create the interference fit mentioned above. The slot 54 receives a fastener, like the fastener 46, from another extension or from a base section. The slot slides past the fastener as the smaller upper portion of the base section or of another extension are engaged. When they are fully engaged, the projection springs into the opening 52 and the right wall 24b is flanked by the upper portion wall of a base section or other extension and the fastener head. The fastener may then be rotated inwardly to create a friction fit between the extension and the engaged upper portion.

The fastener 46 includes a bolt surrounded by a tamper-proof washer. The bolt is restrained by the bracket 44 which is attached to the upper portion 30 of the extension by suitable fasteners such as rivets. A fastener and bracket 60, 62 are mounted to an upper portion 64 of the base section 14, FIG. 10. The upper portion of the base section also includes a flexible tab 70 and a cylindrical projection 72, and two opposing channel members 74, 76. The base channel members 74, 76 are similar to the extension channel members 34, 36, the flexible tab 70 and the projection 72 are similar to the tab and projection 48, 50 of the extension, and the fastener 60 and the bracket 62 are generally similar to the fastener 46 and the bracket 44 of the extension. Also, the upper portion 64 of the base section includes smaller dimensioned walls 20c, 22c, 24c and 26c which are essentially identical to the upper portion walls 20a, 22a, 24a, 26a of the extension. It may now be appreciated that the telescoping upper portions of the extensions and the upper portion of the base part are essentially identical so that either may be connected to another extension.

The cover section 12 of the pedestal includes a slot 80 in the right wall 24, FIG. 8 and a hole 82 in the left wall 22, FIG. 9. The placement and function of the slot 80 and the hole 82 are identical to the slot 54 and hole 52 of the extension 16. The hole 82 receives a projection, such as the projection 50 of an extension or the projection 72 of a base portion. Similarly the slot 80 receives the fastener 46 of the extension or the fastener 60 of the base section. Either another extension or a cover section may be connected to the extension 16. This enhances the flexibility of the extension; one or more may be used to extend the height of a pedestal depending upon the requirements of a specific location. Meanwhile, inventory is minimized because each extension is identical (within a size category).

The material of the extension is structural foam, such as high density polyethylene, having walls of about 0.19 inches. The height of the extension is approximately eighteen inches of which four inches relates to the upper portion and fourteen inches relates to the lower portion. Thus, each extension is capable of adding fourteen inches to the height of a pedestal. Length and width vary depending on the length and width of the pedestal. Generally these lengths and widths range from about 8.04 by 5.69 inches to about 14.31 inches by 11.81 inches.

In operation, an extension may be added to a pedestal simply by removing the pedestal cover section and mounting plate from the base section and telescoping the lower portion of the extension over the upper portion of the base. The tab locking mechanism will automatically lock the extension to the base and thereafter, the fastener may be tightened to prevent separation. Thereafter, the mounting plate is engaged to the extension and the pedestal cover section is replaced over the upper portion of the extension. Of course, a second extension may be mounted on a first extension. The first extension increases the height of the pedestal by fourteen inches. A second extension will increase the height of the pedestal by another fourteen inches or a total of twenty-eight inches. It should be appreciated that the height of the extension may be more or less than fourteen inches and more than two extensions may be used. To separate the cover section from an extension or one extension from another extension, the fastener is loosened and the projection is dislodged from the hole 52 simply by pushing the projection inwardly into the interior of the housing while at the same time, lifting upwardly on the cover section or the other extension.

It is now apparent that pedestal inventory may be greatly reduced by requiring only pedestal bases and standard covers and extensions. The final height of the pedestal is determined by the number of extensions used if each extension is of the same height. Secondly, it is now apparent that extensions may be added to existing pedestals without disruption of service or disconnection of the cable or any of the service lines. Finally, it is apparent that as many extensions as are required may be used since each extension telescopes over another extension or the base section of the pedestal and each extension includes the same two connecting mechanisms that exist on the pedestal base section. Further, each extension also includes the mounting channel members so that the mounting plate may easily be connected to and disconnected from the uppermost extension in exactly the same manner that the mounting plate operates with the pedestal base section The specification describes in detail an embodiment of the present invention. Other modifications and variations will, under the doctrine of equivalents, come within the scope of the appended claims. For example, changing the dimensions to match existing pedestals or using different connecting mechanisms are considered equivalent structures. Still other alternatives will also be equivalent as will many new technologies. There is no desire or intention here to limit in any way the application of the doctrine of equivalents.

What is claimed is:

1. A data transmission pedestal extension comprising:

a housing having a front wall, left and right side walls, and a rear wall, said housing being divided into an upper portion and a lower portion;

said lower portion of said housing having walls with larger dimensions than the walls of said upper portion;

said lower portion of said housing having an open bottom for receiving an upper portion of a pedestal base section or an upper portion of another pedestal extension, both upper portions being received in a telescoping relationship;

said upper portion of said housing having an open top and dimension to be received by a lower portion of a pedestal cover section or a lower portion of another pedestal extension, both lower portions being received in a telescoping relationship;

openings formed in said upper portion and said lower portion of said housing for allowing said housing to be connected to a cover section and an a base section of a pedestal or to other extension housings; and a fastener and bracket connection about said opening formed in said upper portion of said housing.

2. An apparatus as claimed in claim 1 wherein:

said opening in said lower portion of said housing forms a slot.

3. An apparatus as claimed in claim 2 including:

a pair of generally oppositely disposed mounting channel members formed on inner sides of said left side wall and said right side wall of said housing.

4. A data transmission pedestal extension comprising:

a housing having a front wall, left and right side walls, and a rear wall, said housing being divided into an upper portion and a lower portion;

said lower portion of said housing having walls with larger dimensions than the walls of said upper portion;

said lower portion of said housing having an open bottom for receiving an upper portion of a pedestal base section or an upper portion of another pedestal extension, both upper portions being received in a telescoping relationship;

said upper portion of said housing having an open top and dimension to be received by a lower portion of a pedestal cover section or a lower portion of another pedestal extension, both lower portions being received in a telescoping relationship;

openings formed in said upper portion and said lower portion of said housing for allowing said housing to be connected to a cover section and an a base section of a pedestal or to other extension housings; and said opening in said lower portion of said housing forms a slot.

5. A data transmission pedestal extension comprising:

a housing having a front wall, left and right side walls, and a rear wall, said housing being divided into an upper portion and a lower portion;

said lower portion of said housing having walls with larger dimensions than the walls of said upper portion;

said lower portion of said housing having an open bottom for receiving an upper portion of a pedestal base section or an upper portion of another pedestal extension, both upper portions being received in a telescoping relationship;

said upper portion of said housing having an open top and dimension to be received by a lower portion of a pedestal cover section or a lower portion of another pedestal extension, both lower portions being received in a telescoping relationship;

openings formed in said upper portion and said lower portion of said housing for allowing said housing to be connected to a cover section and an a base section of a pedestal or to other extension housings; and a pair of generally oppositely disposed mounting channel members formed on inner sides of said left side wall and said right side wall of said housing.

6. A data transmission pedestal extension comprising:

a housing having a front wall, left and right side walls, and a rear wall, said housing being divided into an upper portions and a lower portion;

said lower portion of said housing having walls with larger dimensions than the walls of said upper portion;

said lower portion of said housing having an open bottom for receiving an upper portion of a pedestal base section or an upper portion of another pedestal extension, both upper portions being received in an telescoping relationship;

said upper portion of said housing having an open top and dimension to be received by a lower portion of a pedestal cover section or a lower portion of another pedestal extension, both lower portions being received in a telescoping relationship;

openings formed in said upper portion and said lower portion of said housing for allowing said housing to be connected to a cover section and a base section of a pedestal or to another extension housings;

a flexible arm formed in said upper portion of said housing; and a projection mounted on said flexible arm.

7. A data transmission pedestal extension comprising:

a housing having a front wall, left and right side walls, and a rear wall, said housing being divided into an upper portions and a lower portion;

said lower portion of said housing having walls with larger dimensions than the walls of said upper portion;

said lower portion of said housing having an open bottom for receiving an upper portion of a pedestal base section or an upper portion of another pedestal extension, both upper portions being received in an telescoping relationship;

said upper portion of said housing having an open top and dimension to be received by a lower portion of a pedestal cover section or a lower portion of another pedestal extension, both lower portions being received in a telescoping relationship;

openings formed in said upper portion and said lower portion of said housing for allowing said housing to be connected to a cover section and a base section of a pedestal or to other extension housings;

a fastener and bracket connected about said opening formed in said upper portion of said housing;

said opening in said lower portion of said housing forms a slot;

a pair of generally oppositely disposed mounting channel members form on inner sides of said left side wall and said right side wall of said housing;

a flexible arm formed in said upper portion of said housing; and a projection mounted on said flexible arm.

8. An apparatus as claimed in claim 7 including:

a second opening formed in said lower portion of said housing, said second opening for receiving a projection when said housing is connected to a base section of a pedestal or to another housing.

9. An expandable data transmission pedestal comprising in combination:

a cover section, said cover section having a lower portion;

a base section, said base section having a reduced dimensioned upper portion;

at least one extension section removably connectable to said cover section and to said base section and to other extension sections, said at least one extension section including an upper portion and a lower portion, said lower portion having a wall of larger dimension than a similar wall of said upper portion;

said at least one extension section having an open top and an open bottom and being connectable between said cover section and said base section;

said upper portion of said at least one extension section being generally identical to said upper portion of said base; and said lower portion of said at least one extension section being generally identical to said lower portion of said cover section.

10. An apparatus as claimed in claim 9 including:

a fastener connected to said upper portion of said at least one extension section and to said upper portion of said base section.

11. An apparatus as claimed in claim 10 wherein:

said upper portion of said at least one extension section is identical to said upper portion of said base section.

12. An apparatus as claimed in claim 9 including:

a projection in said upper portion of said at least one extension section.

13. An apparatus as claimed in claim 12 wherein:

said upper portion of said at least one extension section is identical to said upper portion of said base section.

14. An apparatus as claimed in claim 9 including:

a first opening in said lower portion of said at least one extension section.

15. An apparatus as claimed in claim 14 wherein:

said lower portion of said at least one extension section is identical to said lower portion of said cover section.

16. An apparatus as claimed in claim 14 including:

a second opening in said lower portion of said at least one extension section.

17. An apparatus as claimed in claim 16 wherein:

said lower portion of said at least one extension section is identical to said lower portion of said cover section.

18. An apparatus as claimed in claim 9 including:

a fastener connected to said upper portion of said at least one extension section;

a projection connected to said upper portion of said at least one extension section;

a first opening in said lower portion of said at least one extension section;

a second opening in said lower portion of said at least one extension section; and wherein said upper portion of said at least one extension section is identical to said upper portion of said base section; and said lower portion of said at least one extension section is identical to said lower portion of said cover section.

* * * * *